US010338940B2

(12) United States Patent
Campion et al.

(10) Patent No.: US 10,338,940 B2
(45) Date of Patent: *Jul. 2, 2019

(54) ADJUSTING ADMINSTRATIVE ACCESS BASED ON WORKLOAD MIGRATION

(75) Inventors: Nicholas F. Campion, Rochester, MN (US); Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 13/534,113

(22) Filed: Jun. 27, 2012

(65) Prior Publication Data
US 2014/0007085 A1     Jan. 2, 2014

(51) Int. Cl.
G06F 9/455     (2018.01)
G06F 21/45     (2013.01)

(52) U.S. Cl.
CPC .............. *G06F 9/455* (2013.01); *G06F 21/45* (2013.01)

(58) Field of Classification Search
CPC ................................ G06F 9/455; G06Q 10/00
See application file for complete search history.

(56) References Cited

U.S. PATENT DOCUMENTS

| | | | | |
|---|---|---|---|---|
| 8,484,309 B2* | 7/2013 | Bong | | G06F 9/468 709/217 |
| 2006/0274774 A1* | 12/2006 | Srinivasan et al. | | 370/420 |
| 2007/0067349 A1* | 3/2007 | Jhaveri | | G06F 17/30206 |
| 2007/0239979 A1* | 10/2007 | Berger et al. | | 713/150 |
| 2007/0289024 A1* | 12/2007 | Mohammed | | 726/28 |
| 2008/0022368 A1* | 1/2008 | Field | | H04L 63/102 726/4 |
| 2009/0172168 A1* | 7/2009 | Sonoda et al. | | 709/226 |
| 2009/0307245 A1* | 12/2009 | Mullen | | G06F 17/30079 |
| 2009/0307686 A1* | 12/2009 | Hepkin | | 718/1 |
| 2009/0307688 A1* | 12/2009 | Pafumi et al. | | 718/1 |
| 2010/0131949 A1 | 5/2010 | Ferris | | |
| 2011/0161952 A1* | 6/2011 | Poddar | | G06F 9/455 717/173 |

(Continued)

OTHER PUBLICATIONS

Fabrice 44, IBM hardware Management Console, Wikipedia, Oct. 2, 2010, 3 pages.*

(Continued)

*Primary Examiner* — Emerson C Puente
*Assistant Examiner* — Zhi Chen
(74) *Attorney, Agent, or Firm* — Patterson + Sheridan, LLP

(57) ABSTRACT

Embodiments of the invention may provide an approach for adjusting administrative access based upon migration of a workload from one system to another. An associated method migrating a workload from a source system to a target system generally may include detecting migration of the workload from the source system to the target system. The method further may include accessing the source system to determine an identity of an administrator. The method further may include adjusting access rights of the administrator for compatibility with the target system. The source system may be an unallocated server or a server allocated to a system pool. Similarly, the target system may be an unallocated server or a server allocated to a system pool.

3 Claims, 7 Drawing Sheets

(56) References Cited

U.S. PATENT DOCUMENTS

| | | | |
|---|---|---|---|
| 2011/0191477 A1* | 8/2011 | Zhang | G06F 15/173 709/226 |
| 2011/0219371 A1* | 9/2011 | Eide et al. | 718/1 |
| 2011/0225373 A1* | 9/2011 | Ito | G06F 12/0815 711/145 |
| 2012/0233611 A1* | 9/2012 | Voccio | 718/1 |
| 2013/0054776 A1* | 2/2013 | Kunze | G06F 9/5061 709/224 |

OTHER PUBLICATIONS

Definitions of HMC roles, IBM Knowledge Center, Oct. 30, 2009, 1 page.*
Predefined passwords for hscroot and root user IDs, IBM Knowledge Center, Oct. 30, 2009, 1 page.*
Citrix Inc. "Citrix XenServer® 5.6 Administrator's Guide", Jun. 2010, Fort Lauderdale, FL, USA.

* cited by examiner

10# ADJUSTING ADMINSTRATIVE ACCESS BASED ON WORKLOAD MIGRATION

BACKGROUND

Embodiments of the invention are directed to techniques for adjusting administrative access based on workload migration. More specifically, embodiments of the invention provide methods of dynamically altering access rights of a workload administrator upon migrating the workload from one system to another.

In a modern data center, a workload may run on an unallocated server functioning independently of other servers. Alternatively, a workload may run on a server that is allocated to a system pool (i.e., an allocated server). A workload may be composed of one or more virtual machines. A system pool is a cloud or ensemble of servers supporting a group of workloads. A system pool groups together multiple physical servers that are virtualized by respective hypervisors.

Conventionally, roles and access permissions of a workload administrator are defined with respect to a single workload or a static group of workloads. Such roles and access permissions define workload administrator rights and responsibilities with respect to a workload as well as a system on which the workload is running. When a workload migration occurs, the roles and access permissions of the workload administrator with respect to the workload as well as the system on which the workload is running may change based on differences between the source system and the target system. In some cases, appropriate access permissions with respect to a target system may differ from those with respect to a source system. For instance, upon migrating a workload from an unallocated server to an allocated server, access permissions that were appropriate for a workload administrator on the unallocated server may become infeasible, since such access permissions may conflict with roles and access permissions of the relevant system pool administrator. Conversely, upon migrating a workload from an allocated server to an unallocated server, access permissions with respect to the relevant system pool and the allocated server on which the workload was running may be necessary no longer.

SUMMARY

Embodiments of the invention may be used to adjust administrative access based upon migration of a workload from one system to another, wherein the workload may include one or more virtual machines. One embodiment of the invention includes a method for migrating a workload from a source system to a target system, wherein the workload includes one or more virtual machines. This method may generally include detecting migration of the workload from the source system to the target system, accessing the source system to determine an identity of an administrator associated with the workload, and adjusting access rights of the administrator on the target system to provide access to the migrated workload.

In one embodiment, the source system may be a first unallocated server, and the target system may be a second unallocated server. In this embodiment, adjusting access rights of the administrator may include granting the administrator access rights to the second unallocated server consistent with access rights of the administrator to the first unallocated server. Upon determining that the administrator no longer owns a workload on the first unallocated server subsequent to the migration, the adjusting step further may include revoking access rights of the administrator to the first unallocated server.

In another embodiment, the source system may be an unallocated server, and the target system may be a server allocated to a system pool. In this embodiment, adjusting access rights of the administrator may include granting the administrator access rights to the server allocated to the system pool consistent with access rights of the administrator to the unallocated server. The adjusting step further may include accessing a management console of the system pool to determine categories of policies available in the system pool, granting the administrator access rights with respect to policies within the categories that are analogous to policies applicable to the workload on the unallocated server, and revoking access rights of the administrator to tasks that conflict with the active policies defined for the system pool within the categories. Upon determining that the administrator no longer owns a workload on the unallocated server subsequent to the migration, the adjusting step further may include revoking access rights of the administrator to the unallocated server.

In another embodiment, migrating the workload from the source system to the target system may include relocating an unallocated server on which the workload is running to a system pool. In this embodiment, adjusting access rights of the administrator may include accessing a management console of the system pool to determine categories of policies available in the system pool, granting the administrator access rights with respect to policies within the categories that are analogous to policies applicable to the workload on the unallocated server, and revoking access rights of the administrator to tasks that conflict with the active policies defined for the system pool within the categories.

In another embodiment, the source system may be a first server allocated to a system pool, and the target system may be a second server allocated to the system pool. In this embodiment, adjusting access rights of the administrator may include granting the administrator access rights to the second server consistent with access rights of the administrator to the first server. Upon determining that the administrator no longer owns a workload on the first server subsequent to the migration, the adjusting step further may include revoking access rights of the administrator to the first server.

In another embodiment, the source system may be a server allocated to a system pool, and the target system may be an unallocated server. In this embodiment, adjusting access rights of the administrator may include removing access restrictions for the administrator that are associated with the system pool and granting the administrator full access rights to the unallocated server. Upon determining that the administrator no longer owns a workload on the server allocated to the system pool subsequent to the migration, the adjusting step further may include revoking access rights of the administrator to the server allocated to the system pool. Upon determining that the administrator no longer owns a workload on a system allocated to the system pool subsequent to the migration, the adjusting step further may include revoking access rights of the administrator to the system pool.

In a further embodiment, the source system may be a server allocated to a first system pool, and the target system may be a server allocated to a second system pool. In an additional embodiment, migrating the workload from the source system to the target system may include relocating a server on which the workload is running out of a system pool.

Additional embodiments include a computer-readable storage medium storing an application, which, when executed on a processor, performs the above recited method as well as a system having a processor and a memory storing a program, which, when executed on the processor, performs the above recited method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
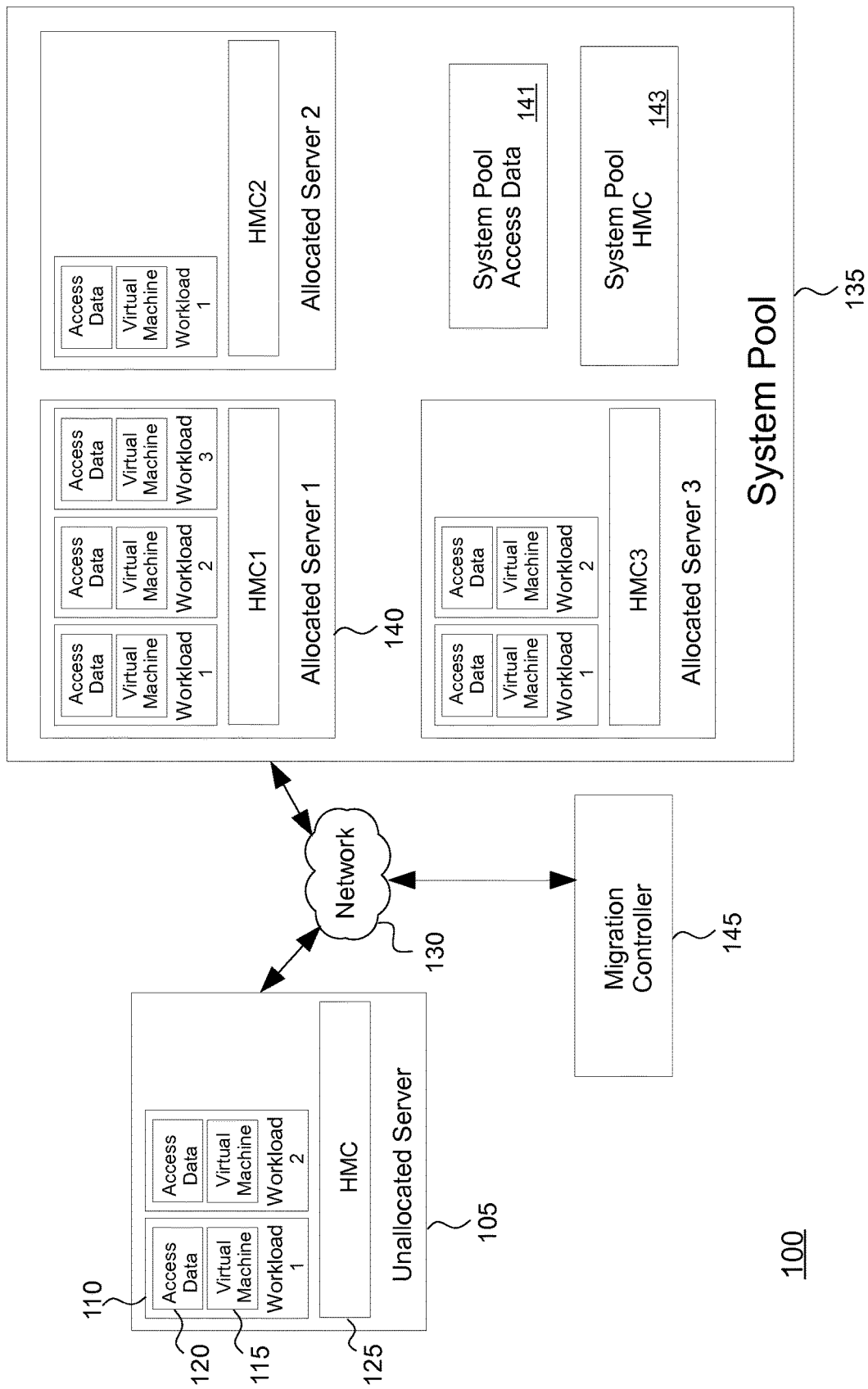
FIG. 1 illustrates a data center infrastructure including an unallocated server and a system pool, according to one embodiment of the invention.

Embodiments of the invention provide techniques for adjusting administrative access based on migration of a workload from one system to another. According to the embodiments, a data center migration controller may facilitate a workload migration. Such migration controller may communicate with a lead data center administrator, automated data center enterprise software, or a combination of both.

A data center may include one or more servers. A data center server may be an unallocated server functioning independently of other servers within the data center. Alternatively, a server may be allocated to a system pool of the data center (i.e., an allocated server). A system pool is a group of servers that may function collaboratively to provide resources to workloads. For example, a system pool of the data center may be adapted to accomplish a set of specialized data collection tasks within the data center. In another example, a system pool may include specialized hardware.

A workload may be assigned to either an unallocated server or an allocated server. A workload administrator may opt to migrate a workload from a source server to a target server for various reasons. For instance, the workload administrator may require resources not provided by the source server. When a workload migration occurs, the access roles and/or permissions of the workload administrator may not exist or may be inconsistent with access policies permitted by the target server or a system pool in which the target server may be located. Accordingly, the data center migration controller may detect the migration, scan the hardware management console (HMC) of the source system to determine the identity of the workload administrator, and adjust access rights of the workload administrator for compatibility with the target system.

For instance, a workload administrator may opt to migrate a data center workload from an unallocated server to a server allocated to a system pool. Such migration may permit a workload to run more efficiently. To facilitate the migration, the migration controller may detect relocation of the workload from the unallocated server to the allocated server. Subsequent to detecting the workload relocation, the migration controller may scan the HMC of the unallocated server to determine the identity of the workload administrator. Upon determining the identity of the workload administrator, the migration controller may grant the workload administrator the same access rights to the allocated server as the workload administrator had to the unallocated server with respect to the workload. Additionally, the migration controller may grant the workload administrator partial access to policies of the system pool. More specifically, the migration controller may determine categories of policies available in the system pool. Upon determining categories of policies available in the system pool, the migration controller may grant the workload administrator administrative access to policies within system pool categories that are analogous to the policies applicable to the workload on the unallocated server. Moreover, the migration controller may revoke access rights of the workload administrator to tasks that conflict with active policies defined for the system pool.

In this example, when inconsistencies with respect to administrative access roles or permissions arise from the migration, the migration controller addresses such inconsistencies by granting the workload administrator access rights to both the allocated server and the system pool and revoking access rights to tasks that conflict with system pool policies.

Other workload migrations may occur according to alternative embodiments. For instance, a workload administrator may opt to migrate a workload from a source unallocated server to a target unallocated server. Additionally, a workload administrator may opt to migrate an entire unallocated server to a system pool. Further, a workload administrator may opt to migrate a workload from a source allocated server to a target allocated server. Further still, a workload administrator may opt to migrate a workload from an allocated server to an unallocated server.

Embodiments of the invention may have various applications. For instance, migrations from an unallocated server to an allocated server may increase workload efficiency or may enable access to additional computing resources or special hardware. Additionally, migrations from a source allocated server to a target allocated server may facilitate workload balancing within a single system pool or among multiple system pools, which in turn may increase overall efficiency. Furthermore, migrations from an allocated server to an unallocated server may be advantageous when a special system pool resource is no longer needed, or when a higher priority workload needs system pool resources more than the workload to be migrated.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium or, alternatively, a computer readable signal medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a hard disk, a random access memory (RAM), a read-only memory (ROM), an erasable programmable read-only memory (EPROM or Flash memory), a portable compact disc read-only memory (CD-ROM), an optical storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources (as well as embodiments of the invention) may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, workloads of an unallocated server or a server allocated to a system pool may be deployed to a computing cloud (whether the cloud itself is provided by the enterprise or a third party). Moreover, cloud-based database systems, virtual machines, and a variety of other server applications may be used to manage workloads of an unallocated server or an allocated server.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, particular embodiments of the invention describe techniques for adjusting administrative access based on migration of a workload from one system to another. However, it should be understood that the techniques described herein may be adapted to a variety of purposes in addition to the uses for adjusting administrative access. Accordingly, references to the specific embodiments are included to be illustrative and not limiting.

FIG. 1 illustrates a data center infrastructure 100. As shown, the data center infrastructure 100 may include an unallocated server 105. Although shown as a single unallocated server, unallocated server 105 is included to be representative of a single unallocated server or multiple unallocated servers. The unallocated server 105 may include one or more workloads 115. Each workload 115 may include a virtual machine 115. Although shown as a single virtual machine, virtual machine 115 is included to be representative of a single virtual machine or multiple virtual machines. Moreover, each workload 115 may include access data 120. Access data 120 for a workload may include data regarding access roles and permissions of the workload administrator. Furthermore, unallocated server 105 may include a hardware management console (HMC) 125 including information regarding the identity of workload administrators having workloads running on the unallocated server 105. Such identity information may be provided in the form of operating system user identities or Lightweight Directory Access Protocol (LDAP) records. Although unallocated server 105 is shown as having two workloads, unallocated server 105 may have more or less workloads at a given time. For instance, the number of workloads on unallocated server 105 may change due to workload migration.

Further, the data center infrastructure 100 may include a system pool 135. The system pool may be connected to the unallocated server 105 (and other systems in the data center infrastructure 100) via network 130. Although shown as a single system pool, system pool 135 is included to be representative of a single system pool or multiple system pools. Illustratively, system pool 135 may include a plurality of servers 140 allocated thereto. Each allocated server 140 may include components similar to the components described above with respect to unallocated server 105. Moreover, system pool 135 may include system pool access data 141. System pool access data 141 may include information regarding system pool access roles and permissions of respective workload administrators. Furthermore, system pool 135 may include a system pool HMC 143 including categories of policies available in the system pool 135. Such categories of policies may address at least one of energy use, storage configuration, network configuration, and security.

Further still, the data center infrastructure 100 may include a migration controller 145. The migration controller 145 may communicate with a lead data center administrator, automated data center enterprise software, or a combination of both. The migration controller 145 may coordinate migration activities within the data center infrastructure 100. For instance, the migration controller 145 may facilitate migration of a workload from the unallocated server 105 to an allocated server 140.

Figure 2:
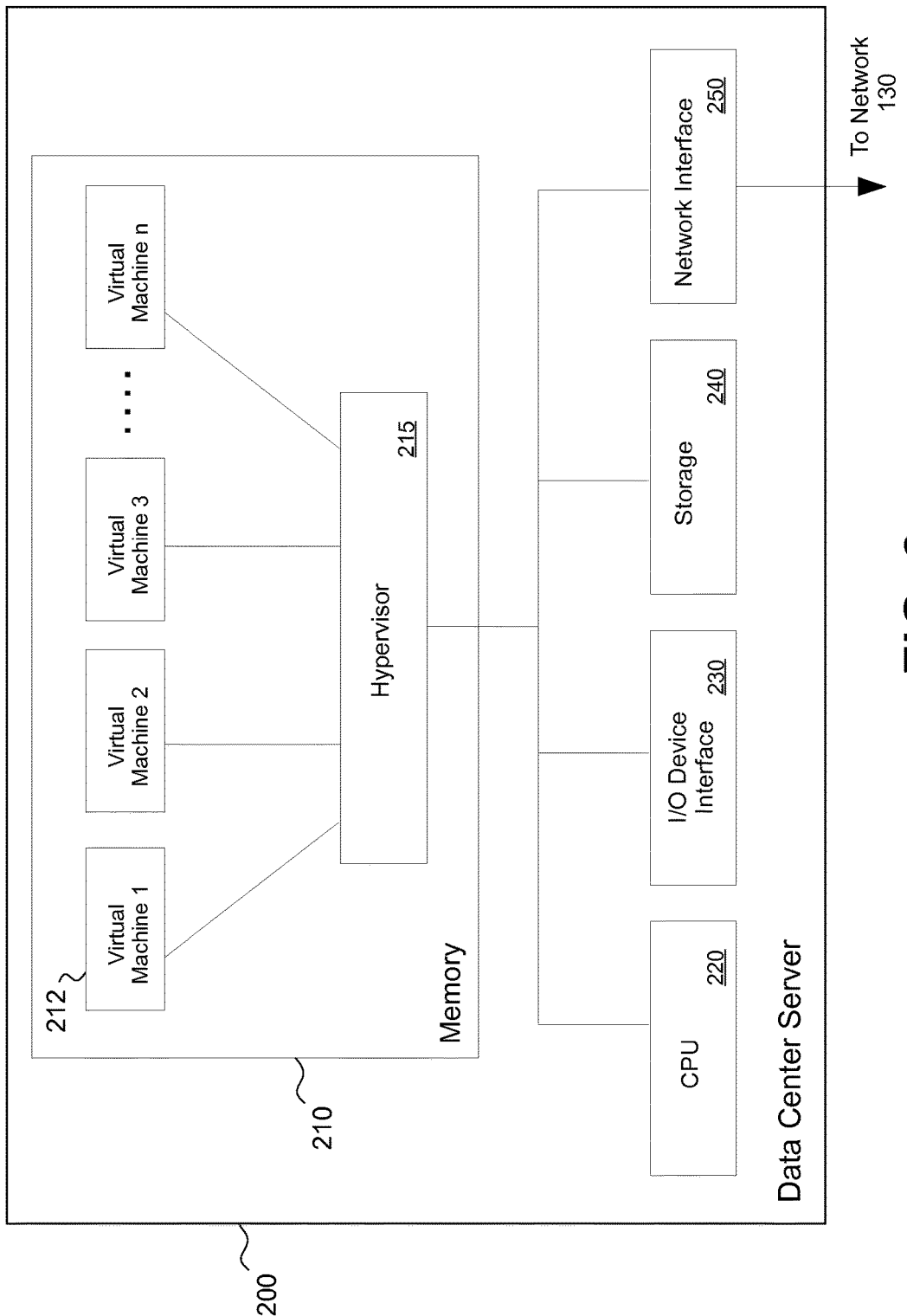
FIG. 2 illustrates a data center server, according to one embodiment of the invention.

FIG. 2 illustrates a data center server 200. The data center server 200 may include a memory 210 and a central processing unit (CPU) 220. The memory 210 may include one or more virtual machines 212 and a hypervisor 215 for launching and managing the virtual machines 212. The hypervisor 215 may intercept system calls made by a virtual machine (guest) operating system and further may manage executing instruction streams on the CPU 220.

The data center server 200 further may include an input/output (I/O) device interface 230 for interacting with one or more I/O devices (not shown). Additionally, the data center server 200 may include a storage 240, which may store access roles and permissions with respect to the virtual machines 212. Furthermore, the data center server 200 may include a network interface 250 for handling communications to and from the network 130.

Figure 3:
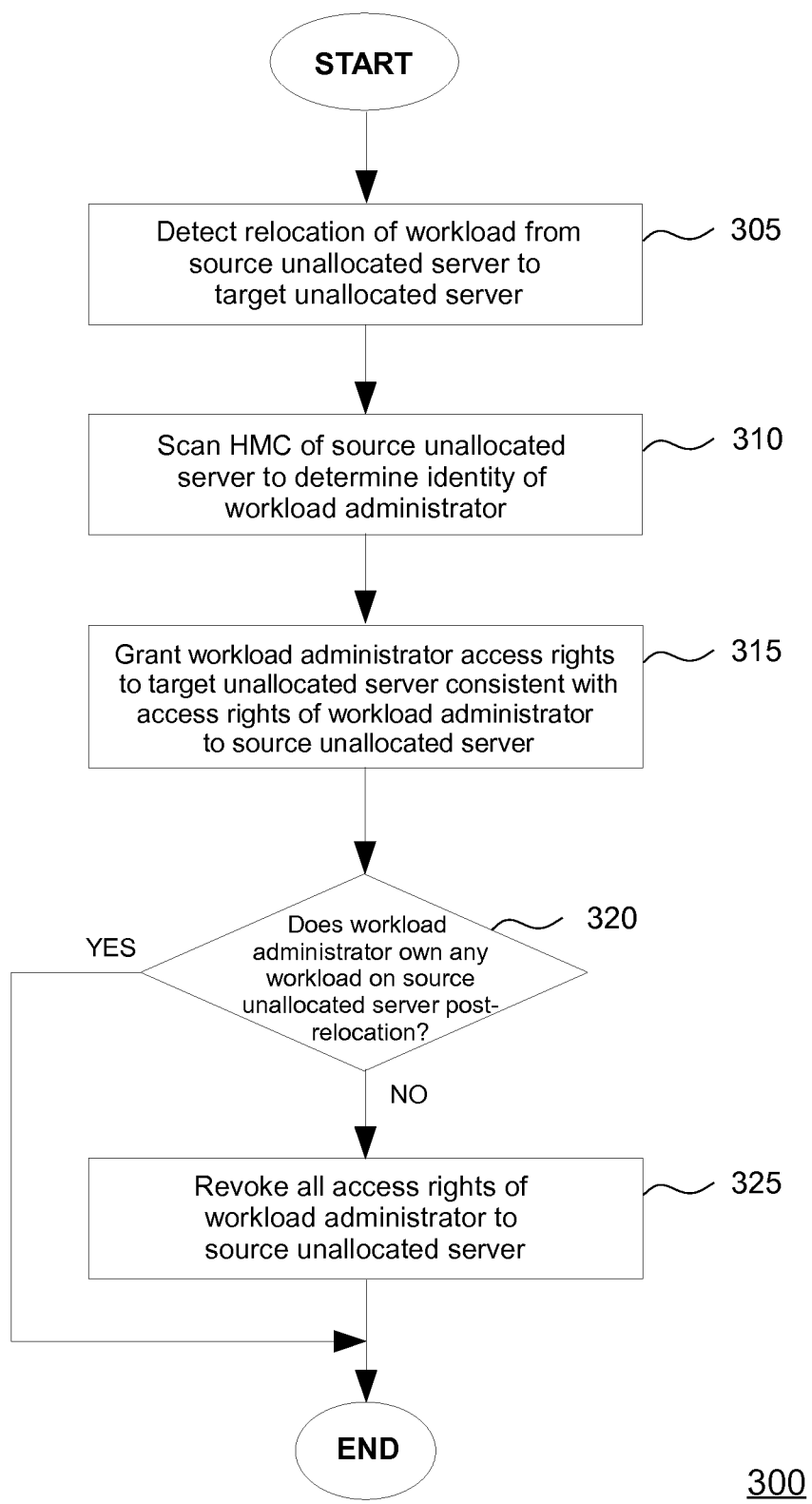
FIG. 3 illustrates a method of migrating a workload from a source unallocated server to a target unallocated server, according to one embodiment of the invention.

FIG. 3 illustrates a method 300 of migrating a workload from a source (first) unallocated server to a target (second) unallocated server. To facilitate the migration, at 305 a migration controller may detect relocation of the workload from the source unallocated server to the target unallocated server. Subsequent to detecting the workload relocation, at 310 the migration controller may scan the hardware management console (HMC) of the source unallocated server to determine the identity of the workload administrator. Upon determining the identity of the workload administrator, at 315 the migration controller may grant the workload administrator access rights to the target unallocated server consistent with access rights of the workload administrator to the source unallocated server. Furthermore, at 320 the migration controller may determine whether the workload administrator owns any workload on the source unallocated server post-relocation. Upon determining that the workload administrator still owns one or more workloads on the source unallocated server, the process may end. Upon determining that the workload administrator no longer owns a workload on the source unallocated server, at 325 the migration controller may revoke all access rights of the workload administrator to the source unallocated server.

Figure 4:
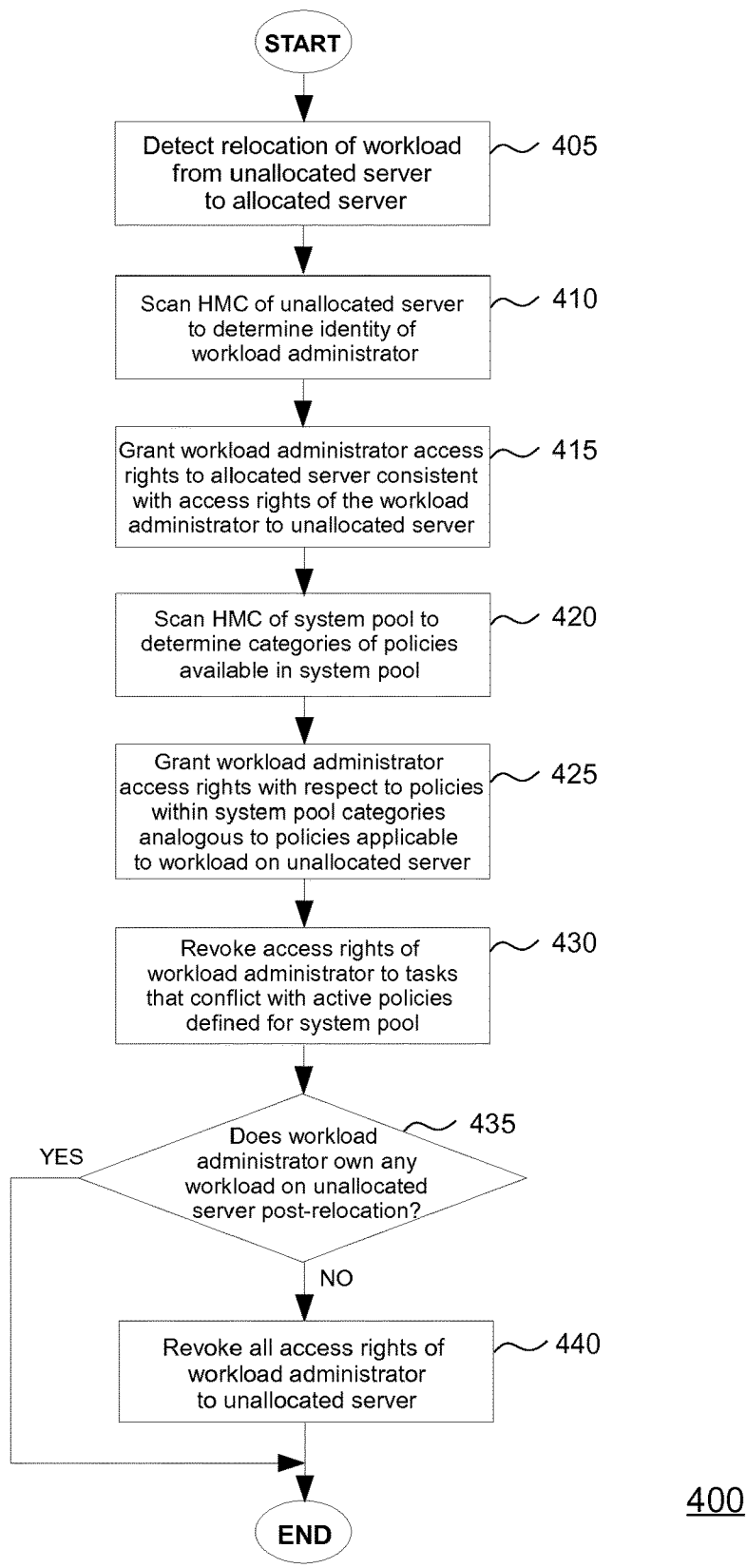
FIG. 4 illustrates a method of migrating a workload from an unallocated server to an allocated server, according to one embodiment of the invention.

FIG. 4 illustrates a method 400 of migrating the workload from an unallocated server to a server allocated to a system pool. To facilitate the migration, at 405 a migration controller may detect relocation of the workload from the unallocated server to the allocated server. Subsequent to detecting the workload relocation, at 410 the migration controller may scan the hardware management console (HMC) of the unallocated server to determine the identity of the workload administrator. Upon determining the identity of the workload administrator, at 415 the migration controller may grant the workload administrator access rights to the allocated server consistent with access rights of the workload administrator to the unallocated server. Additionally, the migration controller may grant the workload administrator partial access to policies of the system pool. More specifically, at 420 the migration controller may scan the HMC of the system pool to determine categories of policies available in the system pool. Such categories of policies may address at least one of energy use, storage configuration, network configuration, and security. Upon determining categories of policies available in the system pool, at 425 the migration controller may grant the workload administrator administrative access rights with respect to policies within the system pool categories that are analogous to the policies applicable to the workload on the unallocated server. Additionally, at 430 the migration controller may revoke access rights of the workload administrator to tasks that conflict with active policies defined for the system pool within the system pool categories. Furthermore, at 435 the migration controller may determine whether the workload administrator owns any workload on the unallocated server post-relocation. Upon determining that the workload administrator still owns one or more workloads on the unallocated server, the process may end. Upon determining that the workload administrator no longer owns a workload on the unallocated server, at 440 the migration controller may revoke all access rights of the workload administrator to the unallocated server. Thus, according to the embodiment, the migration controller may facilitate migration of the workload from the unallocated server to the allocated server by granting the workload administrator access rights to both the allocated server and the system pool.

Figure 5:
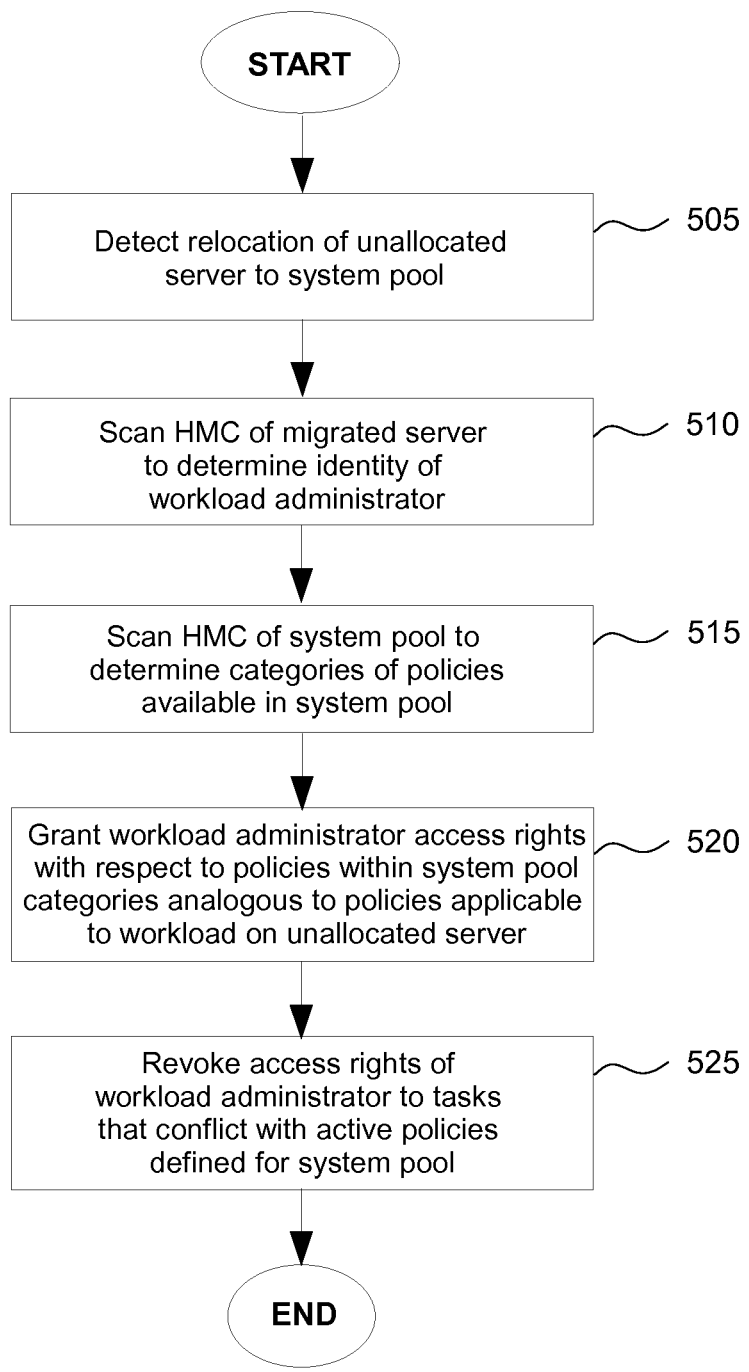
FIG. 5 illustrates a method of migrating an entire unallocated server to a system pool, according to one embodiment of the invention.

FIG. 5 illustrates a method 500 of migrating an entire unallocated server to a system pool. To facilitate the migration, at 505 a migration controller of the system pool may detect relocation of the unallocated server to the system pool. Subsequent to detecting the relocation, at 510 the migration controller may scan the HMC of the migrated server to determine the identity of the workload administrator. Furthermore, at 515 the migration controller may scan the HMC of the system pool to determine categories of policies available in the system pool. Upon determining categories of policies available in the system pool, at 520 the migration controller may grant the workload administrator administrative access rights with respect to policies within system pool categories that are analogous to the policies that were applicable to the workload on the unallocated server prior to the migration. Additionally, at 525 the migration controller may revoke access of the workload administrator to tasks that conflict with active policies defined for the system pool within the system pool categories. For instance, if the migrated server has an energy policy that conflicts with the energy policy of the system pool, then the migration controller may revoke access of the workload administrator to the energy policy. Thus, according to the embodiment, the migration controller may facilitate physical migration of the entire unallocated system to the system pool by granting the workload administrator partial access to system pool policies and revoking access rights of the workload administrator to tasks that conflict with system pool policies.

Figure 6:
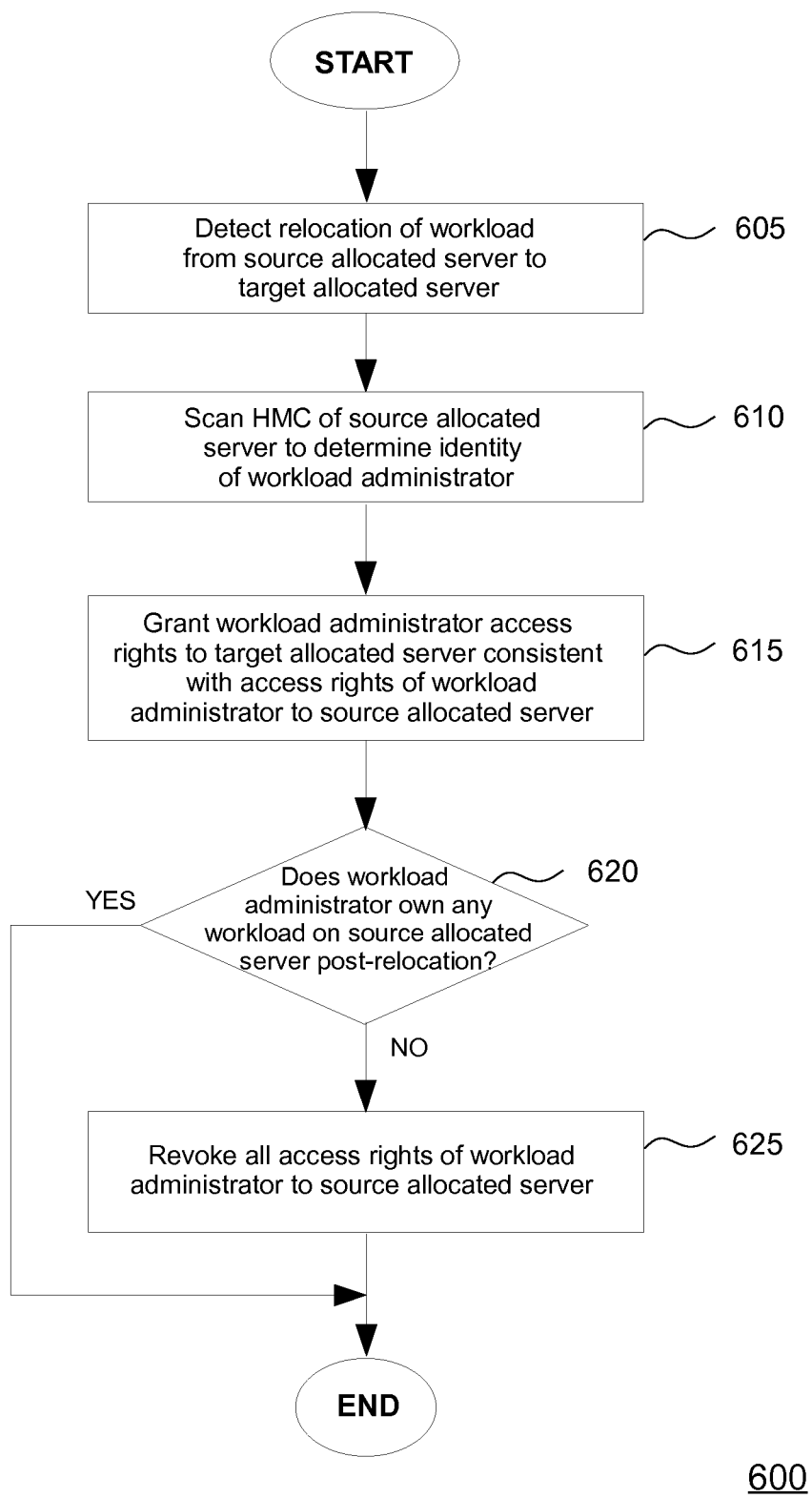
FIG. 6 illustrates a method of migrating a workload from a source allocated server to a target allocated server, according to one embodiment of the invention.

FIG. 6 illustrates a method 600 of migrating a workload from a source (first) server allocated to a system pool to a target (second) server allocated to the system pool. To facilitate the migration, at 605 a migration controller of the system pool may detect relocation of the workload from the source allocated server to the target allocated server. Subsequently, at 610 the migration controller may scan the HMC of the source allocated server to determine the identity of the workload administrator. Upon determining the identity of the workload administrator, at 615 the migration controller may grant the workload administrator access rights to the target allocated server consistent with access rights of the workload administrator to the source allocated server. Furthermore, at 620 the migration controller may determine whether the workload administrator owns any workload on the source allocated server post-relocation. Upon determining that the workload administrator still owns one or more workloads on the source allocated server, the process may end. Upon determining that the workload administrator no longer owns a workload on the source allocated server, at 625 the migration controller may revoke all access rights of the workload administrator to the source allocated server. In this embodiment, partial access to the system pool may be maintained by the workload administrator, as the migration occurs between servers allocated to the same system pool.

Figure 7:
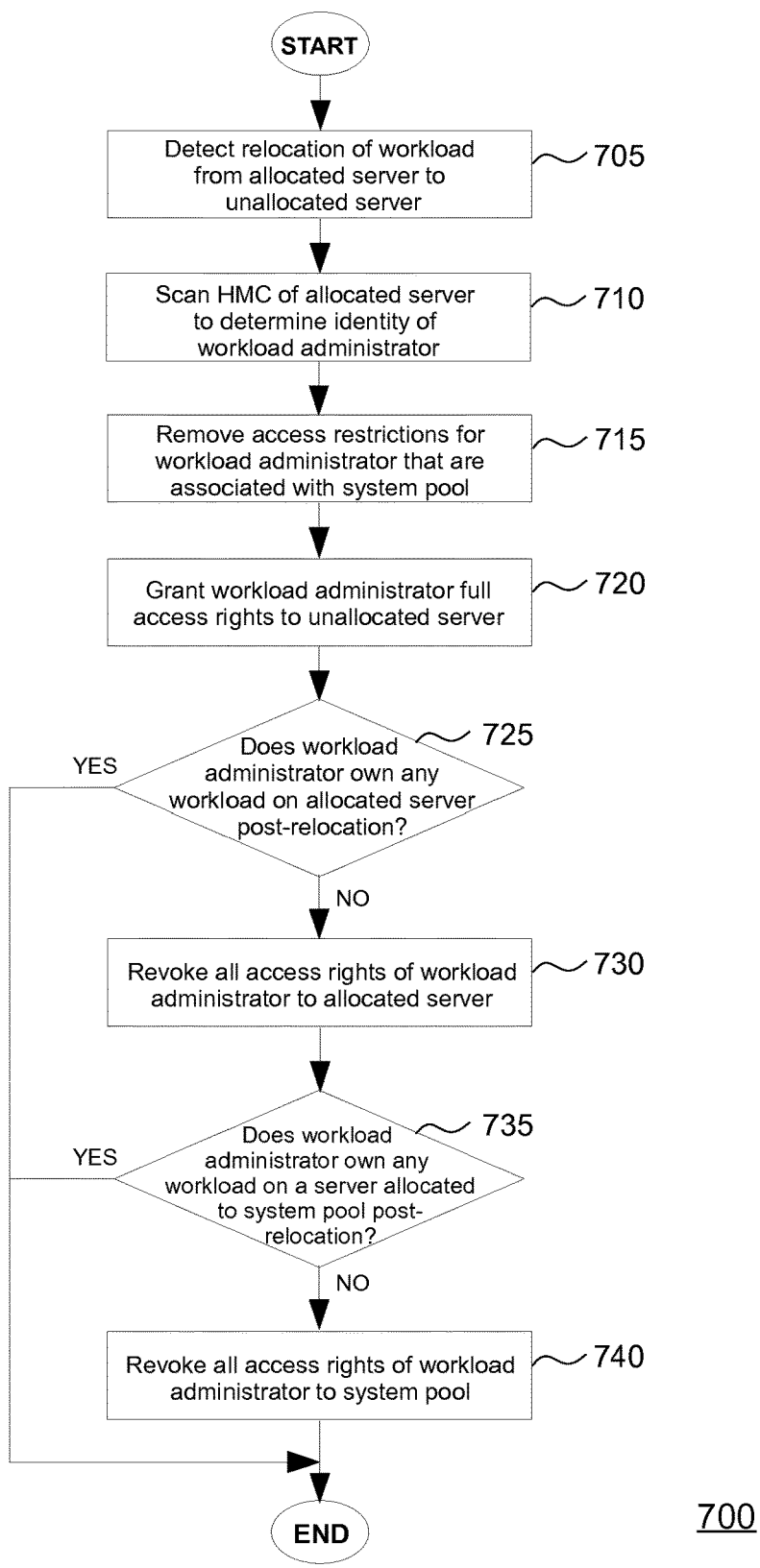
FIG. 7 illustrates a method of migrating a workload from an allocated server to an unallocated server, according to one embodiment of the invention.

FIG. 7 illustrates a method 700 of migrating a workload from a server allocated to a system pool to an unallocated server. To facilitate the migration, at 705 a migration controller of the system pool may detect relocation of the workload from the allocated server to the unallocated server. Subsequent to detecting the workload relocation, at 710 the migration controller may scan the HMC of the allocated server to determine the identity of the workload administrator. Upon determining the identity of the workload administrator, at 715 the migration controller may remove access restrictions with respect to the workload administrator that are associated with the system pool. Furthermore, at 720 the migration controller may grant the workload administrator full access rights to the unallocated server. At 725 the migration controller may determine whether the workload administrator owns any workload located on the allocated server post-relocation. Upon determining that the workload administrator still owns one or more workloads on the allocated server, the process may end. Upon determining that the workload administrator no longer owns a workload on the allocated server, at 730 the migration controller may revoke all access rights of the workload administrator to the allocated server. At 735 the migration controller may determine whether the workload administrator owns any workload on a system allocated to the system pool post-relocation. Upon determining that the workload administrator still owns one or more workloads on a system allocated to the system pool, the process may end. Upon determining that the workload administrator no longer owns a workload on a system allocated to the system pool, at 740 the migration controller may revoke all access rights of the workload administrator to the system pool.

A data center migration controller may facilitate other migrations. For instance, a migration controller may facilitate relocation of a workload from a source server in a first system pool to a target server in a second system pool. For such migration, the migration controller may modify access roles and permissions of the workload administrator in order to make the access rights of the workload administrator compatible with the second system pool. Further, the migration controller may revoke access rights of the workload administrator to the source server upon determining that the workload administrator no longer owns a workload on the source server subsequent to the migration. Further still, the migration controller may revoke access rights of the workload administrator to the first system pool upon determining that the workload administrator no longer owns a workload on a system allocated to the first system pool.

As another example, a migration controller may facilitate relocation of an entire allocated server out of the system pool to which it is allocated such that the allocated server becomes an unallocated server subsequent to the migration. For such migration, the migration controller may revoke any system pool policies that no longer apply to the migrated server. Moreover, the migration controller may remove access restrictions of the workload administrator that are associated with the system pool.

In one embodiment, a migration controller may facilitate migration of a workload from one system to another within a data center. The embodiments provide an efficient and inexpensive solution for adjusting access roles and permissions of a workload administrator consequent to a workload migration While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium storing an application, which, when executed on a processor, performs an operation of migrating a workload from a source system to a target system, the operation comprising:
    detecting migration of the workload from the source system to the target system, Wherein the workload includes one or more virtual machines, and wherein the source system is an unallocated server and the target system is a server allocated to a system pool;
    scanning a hardware management console (HMC) on the source system to determine an identity of an administrator associated with the workload;
    adjusting access rights of the identified administrator to an HMC on the target system to provide access to the migrated workload based, at least in part, on access rights of the identified administrator to the source system;
    adjusting access rights of the identified administrator to the HMC on the source system based on the migration of the workload from the source system to the target system, wherein adjusting access rights of the identified administrator to the HMC on the source system comprises:
        determining whether to revoke access rights of the identified administrator to the source system based on whether or not the identified administrator owns workloads other than the migrated workload executing on the source system,
    granting the administrator access rights to the server allocated to the system pool consistent with access rights of the administrator to the unallocated server,
    scanning a management console of the system pool to determine categories of policies available in the system pool,
    granting the administrator access rights with respect to policies within the categories that are analogous to policies applicable to the workload on the unallocated server,
    revoking access rights of the administrator to tasks that conflict with the active policies defined for the system pool within the categories, and
    upon determining that the administrator no longer owns a workload on the unallocated server subsequent to the migration, revoking access rights of the administrator to the unallocated server; and
    executing the migrated workload on the target system based on the adjusted access rights of the identified administrator.

2. A system comprising:
a processor; and
a memory storing a program, which, when executed on the processor, performs an operation of migrating a workload from a source system to a target system, the operation comprising:
    detecting migration of the workload from the source system to the target system, wherein the workload includes one or more virtual machines, and wherein the source system is an unallocated server and the target system is a server allocated to a system pool,
    scanning a hardware management console (HMC) on the source system to determine an identity of an administrator associated with the workload,
    adjusting access rights of the identified administrator to an HMC on the target system to provide access to the migrated workload based, at least in part, on access rights of the identified administrator to the source system,
    adjusting access rights of the identified administrator to the HMC on the source system based on the migration of the workload from the source system to the target system, wherein adjusting access rights of the identified administrator to the HMC on the source system comprises:
        determining whether to revoke access rights of the identified administrator to the source system based on whether or not the identified administrator owns workloads other than the migrated workload executing on the source system,
    granting the administrator access rights to the server allocated to the system pool consistent with access rights of the administrator to the unallocated server,
    scanning a management console of the system pool to determine categories of policies available in the system pool,
    granting the administrator access rights with respect to policies within the categories that are analogous to policies applicable to the workload on the unallocated server,
    revoking access rights of the administrator to tasks that conflict with the active policies defined for the system pool within the categories, and
    upon determining that the administrator no longer owns a workload on the unallocated server subsequent to the migration, revoking access rights of the administrator to the unallocated server, and
    executing the migrated workload on the target system based on the adjusted access rights of the identified administrator.

3. A system, comprising:
a processor; and
a memory storing a program, which, when executed on the processor, performs an operation of migrating a workload from a source system to a target system, the operation comprising:
    detecting migration of the workload from the source system to the target system, wherein the workload includes one or more virtual machines, and wherein the source system is an unallocated server and the target system is the unallocated server relocated to a system pool, scanning a hardware management console (HMC) on the source system to determine an identity of an administrator associated with the workload, adjusting access rights of the identified administrator to an HMC on the target system to provide access to the migrated workload based, at least in part, on access rights of the identified administrator to the source system, wherein adjusting the access rights of the identified administrator comprises:

scanning a management console of the system pool to determine categories of policies available in the system pool, granting the administrator access rights with respect to policies within the categories that are analogous to policies applicable to the workload on the unallocated, and revoking access rights of the administrator to tasks that conflict with the active policies defined for the system pool within the categories, and executing the migrated workload on the target system based on the adjusted access rights of the identified administrator.

\* \* \* \* \*